United States Patent
Enomoto

(10) Patent No.: US 11,733,752 B2
(45) Date of Patent: Aug. 22, 2023

(54) POWER RECEIVING APPARATUS AND CONTROL METHOD

(71) Applicant: CANON KABUSHIKI KAISHA, Tokyo (JP)

(72) Inventor: Daisuke Enomoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/349,729

(22) Filed: Jun. 16, 2021

(65) Prior Publication Data
US 2021/0397236 A1 Dec. 23, 2021

(30) Foreign Application Priority Data
Jun. 22, 2020 (JP) .................. 2020-107230

(51) Int. Cl.
| | |
|---|---|
| G06F 1/26 | (2006.01) |
| G06F 21/44 | (2013.01) |
| H02J 1/06 | (2006.01) |
| H02J 7/02 | (2016.01) |
| H02J 7/00 | (2006.01) |
| G01R 19/165 | (2006.01) |

(52) U.S. Cl.
CPC ....... *G06F 1/266* (2013.01); *G01R 19/16538* (2013.01); *G06F 21/44* (2013.01); *H02J 1/06* (2013.01); *H02J 7/00034* (2020.01); *H02J 7/00045* (2020.01); *H02J 7/02* (2013.01)

(58) Field of Classification Search
CPC .......... G06F 1/266; G06F 21/44; G06F 21/81; G01R 19/16538; H02J 1/06; H02J 7/00034; H02J 7/00045; H02J 7/02
See application file for complete search history.

(56) References Cited

U.S. PATENT DOCUMENTS 5,884,086 A * 3/1999 Amoni .................. G06F 1/266
 700/282
7,024,567 B2 * 4/2006 Kim ...................... G06F 1/266
 713/340

(Continued)

FOREIGN PATENT DOCUMENTS

CA 2796673 A1 * 5/2013 ........... G06F 13/102
JP 2019-121268 A 7/2019

*Primary Examiner* — Jared Fureman
*Assistant Examiner* — Michael J Warmflash
(74) *Attorney, Agent, or Firm* — Canon U.S.A., Inc. IP Division

(57) ABSTRACT

A power receiving apparatus includes a communication unit capable of communicating with a power supply apparatus, and a control unit that, based on information relating to power which the power supply apparatus is capable of supplying, determines whether or not to perform an authentication communication with the power supply apparatus to authenticate whether or not the power supply apparatus is a predetermined apparatus. The control unit requests the power supply apparatus to supply first power regardless of whether or not the power supply apparatus is the predetermined apparatus, in a case where the authentication communication is not performed, and the control unit requests the power supply apparatus to supply second power in a case where the authentication communication is performed and the power supply apparatus is authenticated as the predetermined apparatus.

17 Claims, 2 Drawing Sheets

(56) References Cited

U.S. PATENT DOCUMENTS

| | | | | |
|---|---|---|---|---|
| 8,332,664 | B2* | 12/2012 | Farrar | G06F 21/81 |
| | | | | 713/340 |
| 10,468,893 | B2* | 11/2019 | Chen | H02J 7/0029 |
| 2009/0273764 | A1* | 11/2009 | D'Alessio | G06F 1/266 |
| | | | | 353/85 |
| 2015/0134893 | A1* | 5/2015 | Anderson | G06F 13/38 |
| | | | | 711/103 |
| 2017/0031403 | A1* | 2/2017 | Waters | G06F 1/266 |
| 2017/0054310 | A1* | 2/2017 | Chen | H02J 7/0068 |
| 2019/0065422 | A1* | 2/2019 | Sporck | H01R 13/7175 |
| 2019/0131810 | A1* | 5/2019 | Lim | H02J 7/342 |
| 2019/0212795 | A1* | 7/2019 | Moritomo | G06F 21/44 |
| 2019/0312462 | A1* | 10/2019 | Shichino | H02J 50/60 |
| 2021/0159737 | A1* | 5/2021 | Shichino | H02J 7/00045 |
| 2021/0349511 | A1* | 11/2021 | Moritomo | H02J 7/00045 |
| 2021/0406360 | A1* | 12/2021 | Kitanosako | G06F 1/26 |
| 2022/0057821 | A1* | 2/2022 | Sekimoto | G01R 31/40 |

\* cited by examiner

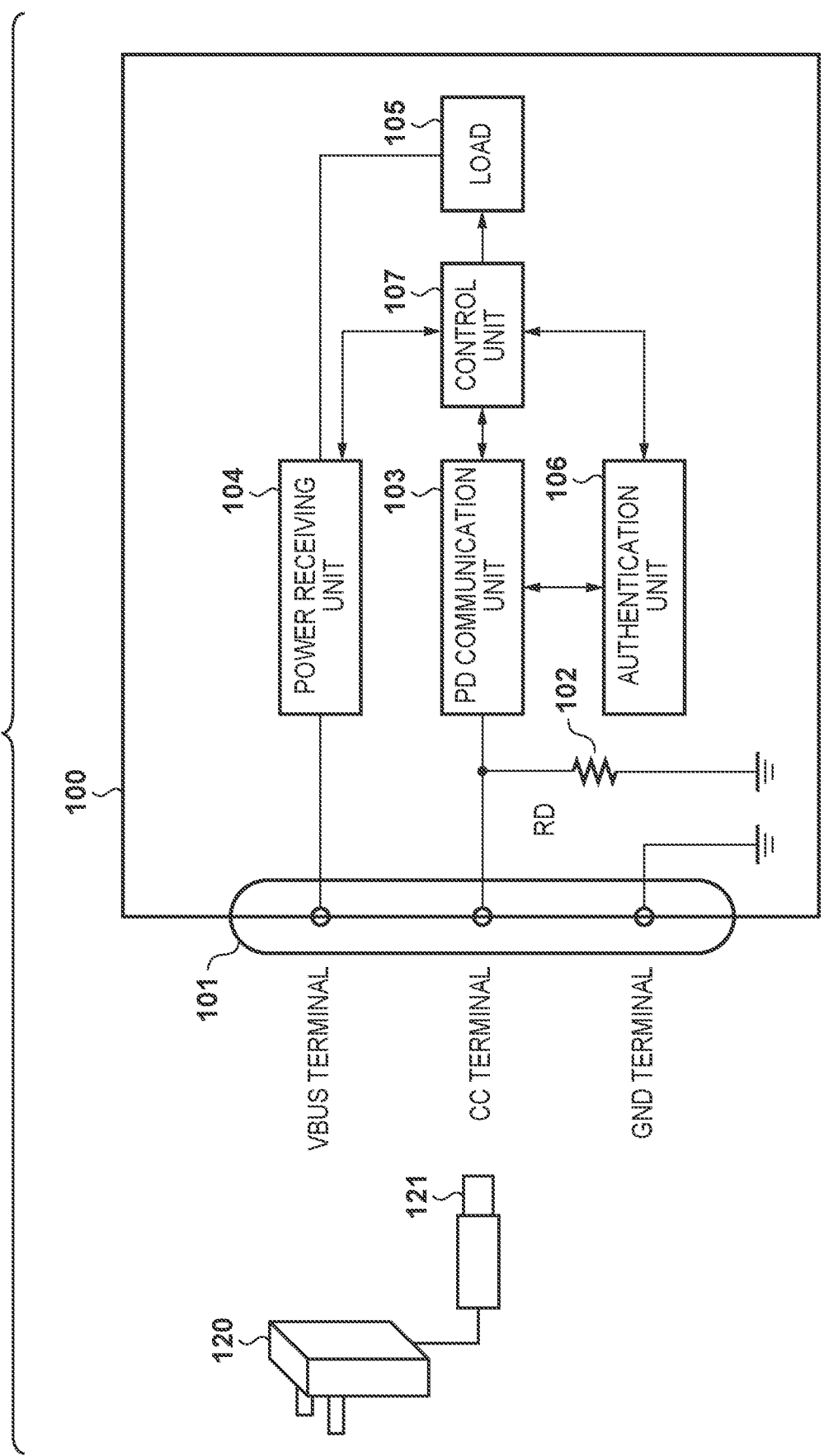

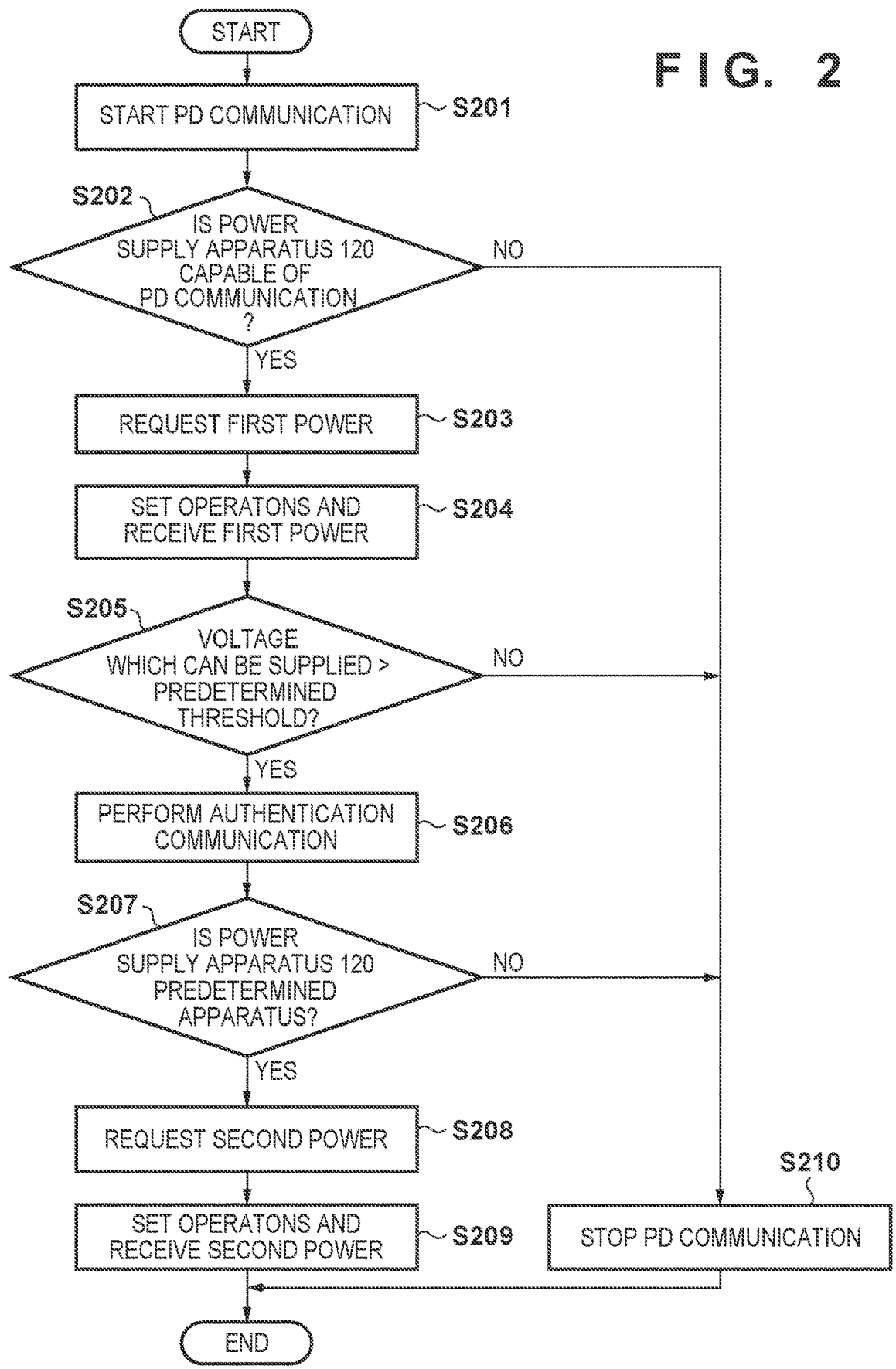

POWER RECEIVING APPARATUS AND CONTROL METHOD

BACKGROUND

Field of the Disclosure

Aspects of the disclosure generally relate to a power receiving apparatus and a method of controlling the power receiving apparatus.

Description of the Related Art

Standards relating to USB (Universal Serial Bus), USB Type-C standard and USB PD (Power Delivery) standard are known. A USB interface compliant with the USB PD standard can supply power at a maximum of 100 W.

Japanese Patent Laid-Open No. 2019-121268 describes a power receiving apparatus that performs an authentication communication in order to authenticate whether or not a power supply apparatus is a predetermined apparatus (an apparatus compliant with the USB PD standard).

Depending on the configuration of the power receiving apparatus, there may be circumstances in which it is desirable to request the power supply apparatus to supply a desired power before performing the authentication communication that is described in Japanese Patent Laid-Open No. 2019-121268.

SUMMARY

According to various embodiments, a power receiving apparatus can request a power supply apparatus to supply power before performing an authentication communication to authenticate whether or not the power supply apparatus is a predetermined apparatus (e.g., an apparatus compliant with the USB PD standard).

According to various embodiments, there is provided a power receiving apparatus including: a communication unit capable of communicating with a power supply apparatus; and a control unit that, based on information relating to power which the power supply apparatus is capable of supplying, determines whether or not to perform an authentication communication with the power supply apparatus to authenticate whether or not the power supply apparatus is a predetermined apparatus. The control unit requests the power supply apparatus to supply first power regardless of whether or not the power supply apparatus is the predetermined apparatus, in a case where the authentication communication is not performed, and the control unit requests the power supply apparatus to supply second power in a case where the authentication communication is performed and the power supply apparatus is authenticated as the predetermined apparatus.

According to various embodiments, there is provided a method comprising: determining, based on information relating to power which a power supply apparatus is capable of supplying, whether or not to perform an authentication communication with the power supply apparatus to authenticate whether or not the power supply apparatus is a predetermined apparatus; requesting the power supply apparatus to supply first power regardless of whether or not the power supply apparatus is the predetermined apparatus, in a case where the authentication communication is not performed; and requesting the power supply apparatus to supply second power in a case where the authentication communication is performed and the power supply apparatus is authenticated as the predetermined apparatus.

Further aspects of the disclosure will become apparent from the following description of exemplary embodiments.

BRIEF DESCRIPTION OF THE DRAWINGS

FIG. 1 is a diagram illustrating elements of a power supply system, and elements of a power receiving apparatus, according to a first embodiment.

FIG. 2 is a flowchart illustrating an example of operation of the power receiving apparatus according to the first embodiment.

DESCRIPTION OF THE EMBODIMENTS

Exemplary embodiments, features, and aspects of the disclosure will be described below with reference to the drawings. However, aspects of the disclosure are not limited to the following embodiments.

[First Embodiment] FIG. 1 is a diagram illustrating elements of a power supply system, and elements of a power receiving apparatus 100, according to a first embodiment. As illustrated in FIG. 1, the power supply system includes a power supply apparatus 120 and the power receiving apparatus 100, which can connect to the power supply apparatus 120. FIG. 1 illustrates an example in which the power supply apparatus 120 is an AC adapter that transforms AC power into DC power. However, the power supply apparatus 120 may be any electronic device as long as it is an electronic device that can supply power to the power receiving apparatus 100. For example, the power supply apparatus 120 may be a mobile battery, a personal computer, or the like.

The first embodiment assumes that the power receiving apparatus 100 operates according to the USB Type-C standard and the USB PD standard. The power receiving apparatus 100 has a receptacle 101 that complies with the USB Type-C standard. The power supply apparatus 120 has a plug 121 that complies with the USB Type-C standard.

Power from the power supply apparatus 120 is supplied to a VBUS terminal of the receptacle 101. A Configuration Channel (CC) terminal of the receptacle 101 is used for communication compliant with the USB PD standard. A GND terminal of the receptacle 101 is connected to a ground potential (GND) of the power receiving apparatus 100.

A pull-down resistor 102 connects the CC terminal of the receptacle 101 to the GND of the power receiving apparatus 100. The pull-down resistor 102 is used for the power supply apparatus 120 to detect a connection with the power receiving apparatus 100, for the power receiving apparatus 100 to determine the power supply capability of the power supply apparatus 120 by voltage. Note that with the USB Type-C standard, an apparatus in which a pull-down resistor is connected to the CC terminal is identified as a power receiving apparatus (a sink), and an apparatus in which a pull-up resistor is connected to the CC terminal is identified as a power supply apparatus (a source).

A control unit 107 is configured to control the elements of the power receiving apparatus 100. The control unit 107 includes, for example, a hardware processor (a CPU or the like) that controls the elements of the power receiving apparatus 100, and memory storing programs that can be executed by the hardware processor. The memory of the control unit 107 stores, for example, a program for implementing the operation of the power receiving apparatus 100 described later.

The power receiving apparatus 100 may be any electronic device as long as it is capable of receiving the supply of power from the power supply apparatus 120. For example, the power receiving apparatus 100 may be an electronic device capable of acting as a digital camera, a personal computer, a tablet, a PDA, a media player, a smartphone, a game console, a robot, a drone, a dashboard camera, or a home appliance. Note that the elements of the power receiving apparatus 100 are not limited to the elements illustrated in FIG. 1.

A PD communication unit 103 connected to the CC terminal of the receptacle 101 performs communication (PD communication), which is compliant with the USB PD standard, with the power supply apparatus 120 connected to the receptacle 101, in response to instructions from the control unit 107. The PD communication unit 103 determines whether or not the power supply apparatus 120 is an apparatus capable of communication compliant with the USB PD standard, and notifies the control unit 107 of a result of the determination. In a case where information indicating the power which the power supply apparatus 120 is capable of supplying (e.g., Source_Capabilities) has been received from the power supply apparatus 120, the PD communication unit 103 can determine that the power supply apparatus 120 is an apparatus capable of communication compliant with the USB PD standard. The power supply capability information received from the power supply apparatus 120 is communicated to the control unit 107 from the PD communication unit 103.

In a case where it is determined that the power supply apparatus 120 is an apparatus capable of communication compliant with the USB PD standard, the control unit 107 performs negotiation communication compliant with the USB PD standard with the power supply apparatus 120 via the PD communication unit 103, and requests the power supply apparatus 120 to supply the desired power.

An authentication unit 106 authenticates whether or not the power supply apparatus 120 is a predetermined apparatus (an apparatus compliant with the USB PD standard) in response to an instruction from the control unit 107. For example, the authentication unit 106 performs an authentication communication compliant with USB Type-C Authentication standard (called the "C-Auth standard" hereinafter) with the power supply apparatus 120 via the PD communication unit 103. The authentication unit 106 notifies the control unit 107 of the result of authenticating the power supply apparatus 120.

A power receiving unit 104 is connected to the VBUS terminal of the receptacle 101, and supplies power supplied from the power supply apparatus 120 via the VBUS terminal to the elements of the power receiving apparatus 100. Additionally, under the control of the control unit 107, the power receiving unit 104 performs control so that power supplied from the power supply apparatus 120 does not exceed a predetermined value. Furthermore, the power receiving unit 104 monitors the voltage at the VBUS terminal, and notifies the control unit 107 when overvoltage is detected. Although details will be given later, upon being notified by the power receiving unit 104 that overvoltage has been detected, the control unit 107 stops the supply of power to the power supply apparatus 120 via the PD communication unit 103.

A load 105 includes circuitry that operates by consuming power supplied from the power receiving unit 104. The configuration of the load 105 differs depending on what type of apparatus the power receiving apparatus 100 can operate as. The power consumption of the load 105 also changes in accordance with what type of operation the power receiving apparatus 100 is performing. For example, if the power receiving apparatus 100 can operate as a digital camera, the load 105 includes a motor for driving a lens unit, an image sensor and related circuitry, an image processing circuit, a display device, a recording device, a speaker, a touch panel, buttons, and switches. For example, if the power receiving apparatus 100 is capable of acting as a digital camera, the power consumption of the load 105 will differ depending on whether or not a live view image is being displayed in the display device, whether or not the lens unit is being driven, and so on.

An example of operation of the power receiving apparatus 100 will be described next with reference to the flowchart in FIG. 2. This example of the operation is started, for example, when the power receiving unit 104 detects that the power supply apparatus 120 has been connected to the receptacle 101 of the power receiving apparatus 100. Note that the power receiving unit 104 detects that the power supply apparatus 120 has been connected to the receptacle 101 when the voltage at the VBUS terminal exceeds a predetermined voltage level. Upon detecting that the power supply apparatus 120 has been connected to the receptacle 101, the power receiving unit 104 notifies the control unit 107 to that effect.

In step S201, the control unit 107 instructs the PD communication unit 103 to start communication compliant with the USB PD standard.

In step S202, when a predetermined message compliant with the USB PD standard is received from the power supply apparatus 120 within a predetermined amount of time, the PD communication unit 103 determines that the power supply apparatus 120 is an apparatus capable of communication compliant with the USB PD standard. Additionally, the PD communication unit 103 determines that the power supply apparatus 120 is an apparatus capable of functioning as a power transmission apparatus. The predetermined message is, for example, a message including information indicating that the power supply apparatus 120 is capable of supplying power (Source_Capabilities). In a case where the predetermined message compliant with the USB PD standard is not received from the power supply apparatus 120 within the predetermined amount of time, the PD communication unit 103 determines that the power supply apparatus 120 is not an apparatus capable of communication compliant with the USB PD standard. The PD communication unit 103 then notifies the control unit 107 that the power supply apparatus 120 is not an apparatus capable of communication compliant with the USB PD standard. In a case where it is determined that the power supply apparatus 120 is an apparatus capable of communication compliant with the USB PD standard, the control unit 107 moves the sequence to step S203. On the other hand, in a case where it is determined that the power supply apparatus 120 is not an apparatus capable of communication compliant with the USB PD standard, the control unit 107 moves the sequence to step S210.

In step S203, the control unit 107 requests, via the PD communication unit 103, the power supply apparatus 120 to supply first power, regardless of whether or not the power supply apparatus 120 is a predetermined apparatus (an apparatus compliant with the USB PD standard). For example, the control unit 107 selects one power from among powers which the power supply apparatus 120 can supply, included in the information the PD communication unit 103 received from the power supply apparatus 120 in step S201.

Then, the control unit 107 sends, to the PD communication unit 103, a message requesting the supply of the selected power (Request).

For example, as the first power, the control unit 107 can select, from among the powers which the power supply apparatus 120 can supply, the minimum power at which the power receiving apparatus 100 can perform the authentication communication with the power supply apparatus 120. Here, the authentication communication is communication for the power receiving apparatus 100 to authenticate whether or not the power supply apparatus 120 is a predetermined apparatus (an apparatus compliant with the USB PD standard). For example, assume that the power supply apparatus 120 is capable of supplying 0.5 W (5 V, 100 mA) or 7.5 W (5 V, 1.5 A), and that the authentication communication requires 2.5 W (5 V, 500 mA). In this case, the control unit 107 selects 7.5 W (5 V, 1.5 A) as the first power.

Alternatively, as the first power, the control unit 107 may select, from among the powers which the power supply apparatus 120 can supply, a power required for the power receiving apparatus 100 to provide some functions. For example, if the power receiving apparatus 100 is a digital camera, power which is insufficient for operating in an image capture mode but which is sufficient for operating in a playback mode can be selected as the first power. Note that even in this case, the first power is at least a power at which the power receiving apparatus 100 can perform the authentication communication with the power supply apparatus 120.

Note that the voltage of the first power is assumed to be less than or equal to a predetermined threshold used in a determination process performed in step S205 (described later). In other words, the voltage of the first power is within a voltage range in which it is determined that the authentication communication is not to be performed.

In step S204, upon receiving, from the power supply apparatus 120 via the PD communication unit 103, a message indicating that the request to supply power has been accepted, the control unit 107 sets the operation of the power receiving unit 104. For example, the control unit 107 sets the power receiving unit 104 to control a current to 500 mA or less, so that the supplied power does not exceed the first power. The power receiving unit 104 supplies the first power, which is supplied from the power supply apparatus 120, to predetermined elements, such as the load 105. Note that the control unit 107 may, as necessary, reduce the power consumption of the load 105 by switching to a power saving mode or the like in order to limit the functions or operation of the load 105.

In step S205, the control unit 107 determines whether or not to perform authentication communication with the power supply apparatus 120. The control unit 107 performs the process of step S206 if it is determined that the authentication communication is to be performed with the power supply apparatus 120, and performs the process of step S210 if it is determined that the authentication communication is not to be performed with the power supply apparatus 120. The control unit 107 determines whether or not to perform the authentication communication with the power supply apparatus 120 (whether or not the authentication communication is necessary) based on the powers which the power supply apparatus 120 can supply, for example. For example, In a case where the voltages which the power supply apparatus 120 can supply include a voltage that exceeds a predetermined threshold, the control unit 107 determines that the authentication communication is to be performed (the authentication communication is necessary). In a case where the voltages which the power supply apparatus 120 can supply do not include a voltage that exceeds the predetermined threshold, the control unit 107 determines that the authentication communication is not to be performed (the authentication communication is unnecessary).

Here, the predetermined threshold can be set by taking into account the power receiving capabilities of the power receiving apparatus 100. By taking into account the power receiving capabilities of the power receiving apparatus 100, damage to the power receiving apparatus 100 can be avoided or reduced, even in a case where the power supply apparatus 120 has supplied a large amount of power, exceeding the power requested from the power supply apparatus 120 by the power receiving apparatus 100, to the power receiving apparatus 100. The predetermined threshold may be set in accordance with the properties (withstand voltage or the like) of the circuit components of the power receiving apparatus 100. The first embodiment assumes that the predetermined threshold is 5 V, for example. The current USB PD standard (Rev. 3, ver. 2.0) allows the supply of 5 V, 9 V, 15 V, or 20 V. Accordingly, the control unit 107 determines that the authentication communication is to be performed with the power supply apparatus 120 in a case where the powers which the power supply apparatus 120 can supply include a power at which a voltage of at least 9 V can be used.

In a case where the powers which the power supply apparatus 120 can supply include a power at which a voltage exceeding the predetermined threshold can be used, it is highly likely that the safety of the power receiving apparatus 100 will be ensured even if a power greater than the power requested by the power receiving apparatus 100 is supplied from the power supply apparatus 120. Thus for the user, it is more convenient for the power receiving apparatus 100 to immediately start operating with the first power than to perform the authentication communication.

Note that in a case where the power supply apparatus 120 has determined not to perform the authentication communication, the control unit 107 instructs the authentication unit 106 to not perform the authentication communication. Alternatively, the control unit 107 does not instruct the authentication unit 106 to perform the authentication communication.

In step S210, the control unit 107 causes the PD communication unit 103 to stop the PD communication. As a result, the supply of the first power from the power supply apparatus 120 is stopped. This returns the power supply apparatus 120 and the power receiving apparatus 100 to the state in effect before the start of the PD communication. Note that in a case where the process of step S210 is performed as a result of the determination made in step S205, the control unit 107 may continue to operate the power receiving apparatus 100 at the first power without stopping the communication compliant with the USB PD standard. This makes it possible to continue providing some of the functions of the power receiving apparatus 100 while ensuring a set level of safety.

On the other hand, consider a situation where the power supply apparatus 120 is capable of supplying power using a voltage exceeding 5 V. Assume, for example, that the powers which the power supply apparatus 120 can supply are 0.5 W (5 V, 100 mA), 7.5 W (5 V, 1.5 A), and 20 W (20 V, 1 A). For example, assume that the power receiving apparatus 100 is a digital camera which cannot operate in an image capture mode at 7.5 W but can operate in the image capture mode at 20 W. In the first embodiment, even if a power of 20 W is ultimately to be requested, the supply of the first power is first received in steps S203 and S204, after which an additional request to supply power at 20 W is made to the power supply apparatus 120. Before requesting power of 20 W, in step S205, the control unit 107 determines whether or not to perform an authentication process. The power of 20 W is supplied at 20 V, and thus in step S205, the control unit 107 determines that the authentication process is to be performed.

In step S206, the control unit 107 instructs the authentication unit 106 to perform the authentication communication. The authentication unit 106 receives the request from the control unit 107 and performs the authentication communication with the power supply apparatus 120 via the PD communication unit 103. In the authentication communication, the authentication unit 106 determines whether or not the power supply apparatus 120 is a predetermined apparatus (an apparatus compliant with the USB PD standard) by verifying the authenticity of a certificate obtained from the power supply apparatus 120, for example. In a case where it is determined that the power supply apparatus 120 is the predetermined apparatus, the authentication unit 106 notifies the control unit 107 that the power supply apparatus 120 is the predetermined apparatus. However, in a case where it is determined that the power supply apparatus 120 is not the predetermined apparatus, the authentication unit 106 notifies the control unit 107 that the power supply apparatus 120 is not the predetermined apparatus.

In step S207, in a case where the control unit 107 has not determined that the power supply apparatus 120 is the predetermined apparatus, the process of step S210 is performed. In this case, the control unit 107 can perform the same operation as when performing the process of step S210 in accordance with the result of the determination made in step S205.

In step S207, in a case where the control unit 107 has determined that the power supply apparatus 120 is the predetermined apparatus, the process of step S208 is performed.

In step S208, the control unit 107 requests, via the PD communication unit 103, the power supply apparatus 120 to supply second power (e.g., 20 W).

In step S209, upon receiving, from the power supply apparatus 120 via the PD communication unit 103, a message indicating that the request to supply power has been accepted, the control unit 107 sets the operation of the power receiving unit 104. For example, the control unit 107 sets the power receiving unit 104 to control a current to 1 A or less, so that the supplied power does not exceed the second power. The power receiving unit 104 supplies the second power, which is supplied from the power supply apparatus 120, to elements such as the load 105. Note that functional limitations in effect during the period in which the supply of the first power was received are removed or relaxed here.

Then, in a case where power supplied from the power supply apparatus 120 is to be changed to a different power, the control unit 107 performs the determination process of step S205 for the power to be changed to. The control unit 107 then performs the process of step S208 in a case where it is determined that the authentication communication is not to be performed with the power supply apparatus 120, and performs the process of step S206 in a case where it is determined that the authentication communication is to be performed with the power supply apparatus 120.

The first embodiment has described a case where the power supply apparatus 120 cannot supply a higher power than the first power as an example of a case where it is determined that the authentication process is not to be performed with the power supply apparatus 120. However, for example, the power supply apparatus 120 is also capable of supplying 0.5 W (5 V, 100 mA) or 7.5 W (5 V, 1.5 A), and 7.5 W (5 V, 1.5 A) can therefore be requested as the second power after 0.5 W (5 V, 100 mA) has been requested as the first power. In this case, the control unit 107 performs the determination process of step S205 before requesting the second power. The control unit 107 then determines not to perform the authentication process for the 7.5 W (5 V, 1.5 A) planned to be requested as the second power. The control unit 107 performs the process of steps S208 and S209 without performing the process of step S210. In step S208, the control unit 107 requests the power supply apparatus 120 to supply 7.5 W (5 V, 1.5 A). Accordingly, the power receiving apparatus 100 can start operating quickly using 7.5 W of power, without performing the authentication process.

In the first embodiment, if requesting the second power, which is higher than the first power, after receiving the supply of the first power from the power supply apparatus 120, it is determined whether or not to perform the authentication communication with the power supply apparatus 120 based on the information of the power which the power supply apparatus 120 can supply. Then, in a case where it is determined that the authentication communication is not to be performed with the power supply apparatus 120, the power supply apparatus 120 is requested to supply the second power without performing the authentication communication with the power supply apparatus 120. Accordingly, in a situation where it is thought that safety can be ensured even in a case where power which is different from the power requested is supplied, such as in a case where a power supply apparatus 120 capable of supplying a low power has been connected, the time it takes for the reception of power to start can be shortened.

[Second Embodiment] The above-described embodiment described an example in which the control unit 107 determines whether or not to perform the authentication communication with the power supply apparatus 120 based on the voltage which the power supply apparatus 120 can supply. However, the control unit 107 may determine whether or not to perform the authentication communication with the power supply apparatus 120 based on a current or a power instead of a voltage. For example, in a case where a maximum current or maximum power which the power supply apparatus 120 can supply is less than or equal to a predetermined threshold, the control unit 107 may determine not to perform the authentication communication with the power supply apparatus 120.

[Third Embodiment] The various functions, processes, or methods described in the above-described embodiments can also be achieved by a personal computer, a microcomputer, a central processing unit (CPU), or a microprocessor executing a program. In a third embodiment, described hereinafter, the personal computer, the microcomputer, the central processing unit (CPU), or the microprocessor will be called a "computer X". Also, in the third embodiment, a program for controlling the computer X and implementing the various functions, processes, or methods described in the above-described embodiments will be called a "program Y".

The various functions, processes, or methods described in the above-described embodiments are realized by the computer X executing the program Y. In this case, the program Y is supplied to the computer X via a computer-readable storage medium. The computer-readable storage medium according to the third embodiment includes at least one of a hard disk device, a magnetic storage device, an optical storage device, a magneto-optical storage device, a memory card, volatile memory (e.g., random access memory), non-volatile memory (e.g., read only memory), or the like. The computer-readable storage medium according to the third embodiment is a non-transitory storage medium.

While aspects of the disclosure are described with reference to exemplary embodiments, it is to be understood that the aspects of the disclosure are not limited to the exemplary embodiments. The scope of the following claims is to be accorded the broadest interpretation so as to encompass all such modifications and equivalent structures.

This application claims the benefit of Japanese Patent Application No. 2020-107230, filed on Jun. 22, 2020, which is hereby incorporated by reference herein in its entirety.

What is claimed is:

1. A power receiving apparatus comprising:
a CPU; and
a memory storing a program which, when executed by the CPU, causes the power receiving apparatus to function as:
a communication unit that communicates with a power supply apparatus connected to the power receiving apparatus, wherein the communication unit receives source capability information indicating power which the power supply apparatus is capable of supplying from the power supply apparatus;
a power receiving unit that receives power from the power supply apparatus;
a control unit that determines first power based on the power indicated by the source capability information received by the communication unit and requests the first power to the power supply apparatus via the communication unit,
wherein the power receiving unit receives the first power from the power supply apparatus in a case where the first power is requested to the power supply apparatus,
wherein the control unit determines, based on the source capability information, whether to perform an authentication whether or not the power supply apparatus connected to the power receiving apparatus is a predetermined power supply apparatus,
wherein the control unit determines to perform the authentication in a case where power corresponding to a voltage exceeding a predetermined threshold voltage is included in the power indicated by the source capability information, and not to perform the authentication in a case where the power corresponding to the voltage exceeding the predetermined threshold voltage is not included in the power indicated by the source capability information;
an authentication unit that performs the authentication based on an authentication communication with the power supply apparatus performed by the communication unit in a case where the control unit determines that the authentication is to be performed,
wherein the authentication by the authentication unit is not performed in a case where the control unit has determined not to perform the authentication,
wherein the control unit requests second power larger than the first power to the power supply apparatus via the communication unit based on the power indicated by the source capability information in a case where the authentication is performed by the authentication unit and the power supply apparatus is authenticated as the predetermined power supply apparatus by the authentication unit, and
wherein the power receiving unit receives the second power from the power supply apparatus in a case where the second power is requested to the power supply apparatus.

2. The power receiving apparatus according to claim 1, wherein the control unit determines to perform the authentication in a case where power corresponding to a current exceeding a predetermined threshold current is included in the power indicated by the source capability information.

3. The power receiving apparatus according to claim 1, wherein the power receiving apparatus receives power from the power supply apparatus in accordance with a USB Power Delivery standard.

4. The power receiving apparatus according to claim 1, wherein the authentication unit performs the authentication in accordance with a USB Type-C Authentication standard.

5. The power receiving apparatus according to claim 1, wherein the power receiving apparatus is capable of acting as a digital camera.

6. The power receiving apparatus according to claim 1, wherein the power receiving apparatus is capable of acting as a smartphone.

7. The power receiving apparatus according to claim 1, wherein the power receiving apparatus is capable of acting as a game console, a robot, or a drone.

8. The power receiving apparatus according to claim 1, wherein the control unit controls the power receiving unit to stop receiving the first power in a case where the control unit has determined not to perform the authentication.

9. A method of controlling a power receiving apparatus that receives power from a power supply apparatus connected to the power receiving apparatus, the method comprising:
receiving source capability information indicating power which the power supply apparatus is capable of supplying from the power supply apparatus;
requesting, based on the power indicated by the source capability information received from power supply apparatus, first power to the power supply apparatus by a communication with the power supply apparatus;
receiving the first power from the power supply apparatus in a case where the first power is requested to the power supply apparatus;
determining, based on the source capability information, whether to perform an authentication whether or not the power supply apparatus connected to the power receiving apparatus is a predetermined power supply apparatus,
wherein the determining determines to perform the authentication in a case where power corresponding to a voltage exceeding a predetermined threshold voltage is included in the power indicated by the source capability information, and not to perform the authentication in a case where the power corresponding to the voltage exceeding the predetermined threshold voltage is not included in the power indicated by the source capability information;
performing the authentication based on an authentication communication with the power supply apparatus,
wherein the authentication by the authentication unit is not performed in a case where the determining has determined not to perform the authentication;
requesting second power larger than the first power to the power supply apparatus by the communication with the power supply apparatus based on the power indicated by the source capability information in a case where it is determined in the determining that the authentication is performed and the power supply apparatus is authenticated in the authenticating as the predetermined power supply apparatus; and receiving the second power from the power supply apparatus in a case where the second power is requested to the power supply apparatus.

10. The method according to claim 9, wherein the determining determines to perform:

the authentication in a case where power corresponding to a current exceeding a predetermined threshold current is included in the power indicated by the source capability information.

11. The method according to claim 9, wherein the power receiving apparatus receives power from the power supply apparatus in accordance with a USB Power Delivery standard.

12. The method according to claim 9, wherein the authentication is performed in accordance with a USB Type-C Authentication standard.

13. The method according to claim 9, wherein the power receiving apparatus is capable of acting as a digital camera.

14. The method according to claim 9, wherein the power receiving apparatus is capable of acting as a smartphone.

15. The method according to claim 9, wherein the power receiving apparatus is capable of acting as a game console, a robot, or a drone.

16. The method according to claim 9, further comprising:

stopping receiving the first power in a case where the determining has determined not to perform the authentication.

17. A non-transitory storage medium that stores a program causing a computer to execute a method of controlling a power receiving apparatus comprising a communication unit that communicates with a power supply apparatus connected to the power receiving apparatus, the method comprising:

receiving source capability information indicating power which the power supply apparatus is capable of supplying from the power supply apparatus;

requesting, based on the power indicated by the source capability information received from power supply apparatus, first power to the power supply apparatus by a communication with the power supply apparatus;

receiving the first power from the power supply apparatus in a case where the first power is requested to the power supply apparatus;

determining, based on the source capability information, whether to perform an authentication whether or not the power supply apparatus connected to the power receiving apparatus is a predetermined power supply apparatus, wherein the determining determines to perform the authentication in a case where power corresponding to a voltage exceeding a predetermined threshold voltage is included in the power indicated by the source capability information, and not to perform the authentication in a case where the power corresponding to the voltage exceeding the predetermined threshold voltage is not included in the power indicated by the source capability information;

performing the authentication based on an authentication communication with the power supply apparatus, wherein the authentication by the authentication unit is not performed in a case where the determining has determined not to perform the authentication;

requesting second power larger than the first power to the power supply apparatus by the communication with the power supply apparatus based on the power indicated by the source capability information in a case where it is determined in the determining that the authentication is performed and the power supply apparatus is authenticated in the authenticating as the predetermined power supply apparatus; and receiving the second power from the power supply apparatus in a case where the second power is requested to the power supply apparatus.

\* \* \* \* \*